(12) United States Patent
Alderman et al.

(10) Patent No.: US 11,364,843 B2
(45) Date of Patent: Jun. 21, 2022

(54) ROADWAY HAZARD WARNING ASSEMBLY

(71) Applicants: Roger Alderman, Coco, FL (US); Helen Alderman, Coco, FL (US)

(72) Inventors: Roger Alderman, Coco, FL (US); Helen Alderman, Coco, FL (US)

(*) Notice: Subject to any disclaimer, the term of this patent is extended or adjusted under 35 U.S.C. 154(b) by 898 days.

(21) Appl. No.: 16/182,263

(22) Filed: Nov. 6, 2018

(65) Prior Publication Data

US 2020/0139885 A1 May 7, 2020

(51) Int. Cl.
*B60Q 7/00* (2006.01)
*B60Q 1/52* (2006.01)
*G09F 17/00* (2006.01)

(52) U.S. Cl.
CPC .............. *B60Q 7/005* (2013.01); *B60Q 1/52* (2013.01); *G09F 17/00* (2013.01); *G09F 2017/0075* (2013.01)

(58) Field of Classification Search
CPC B60Q 7/005; B60Q 1/52; G09F 17/00; G09F 2017/0075
See application file for complete search history.

(56) References Cited

U.S. PATENT DOCUMENTS

| | | | |
|---|---|---|---|
| 4,044,482 A * | 8/1977 | Mosch | B60Q 7/02 40/559 |
| 4,091,553 A | 5/1978 | Glennie | |
| 5,076,196 A * | 12/1991 | Chan | B60Q 1/52 116/28 R |
| 5,224,439 A * | 7/1993 | O'Connell | B60Q 7/02 116/201 |
| 5,398,437 A * | 3/1995 | Bump, Jr. | B60Q 1/50 40/582 |
| 5,502,909 A | 4/1996 | Rabkin | |
| 5,893,226 A * | 4/1999 | Sophocleous | G09F 17/00 40/591 |
| 6,112,443 A | 9/2000 | Stubbs | |
| 6,825,760 B2 | 11/2004 | Sawyer et al. | |
| 7,047,680 B2 | 5/2006 | Myles | |
| 7,404,372 B2 * | 7/2008 | Aasgaard | B60Q 1/52 116/28 R |
| 9,302,615 B2 * | 4/2016 | Carlson | B60P 7/0876 |
| 10,147,342 B2 * | 12/2018 | Gogatz | G09F 17/00 |
| 10,160,381 B1 * | 12/2018 | Hernandez Covarrubias | B60Q 1/30 |
| 2004/0120045 A1 * | 6/2004 | Haines | B60Q 7/005 359/538 |
| 2004/0128888 A1 * | 7/2004 | Payan | G09F 21/04 40/610 |
| 2007/0231067 A1 * | 10/2007 | Roche | B60Q 7/005 404/9 |

(Continued)

*Primary Examiner* — Nimeshkumar D Patel
*Assistant Examiner* — Tania Courson

(57) ABSTRACT

A roadway hazard warning assembly for enhancing visibility of a disabled vehicle on a roadway includes a vehicle that has been disabled on the side of a roadway. A warning flag is positionable on the vehicle when the vehicle becomes disabled on the roadway. The warning flag has light reflecting properties for reflecting light from headlights of oncoming traffic. In this way the warning flag can alert the oncoming traffic to the disabled vehicle. A plurality of fastening straps is provided and each of the fastening straps is removably coupled between the warning flag and the vehicle for retaining the warning flag on the vehicle.

3 Claims, 4 Drawing Sheets

(56) References Cited

U.S. PATENT DOCUMENTS

2009/0009315 A1\* 1/2009 Liu .................. B60Q 1/52
340/471
2018/0061286 A1 3/2018 Gogatz \* cited by examiner

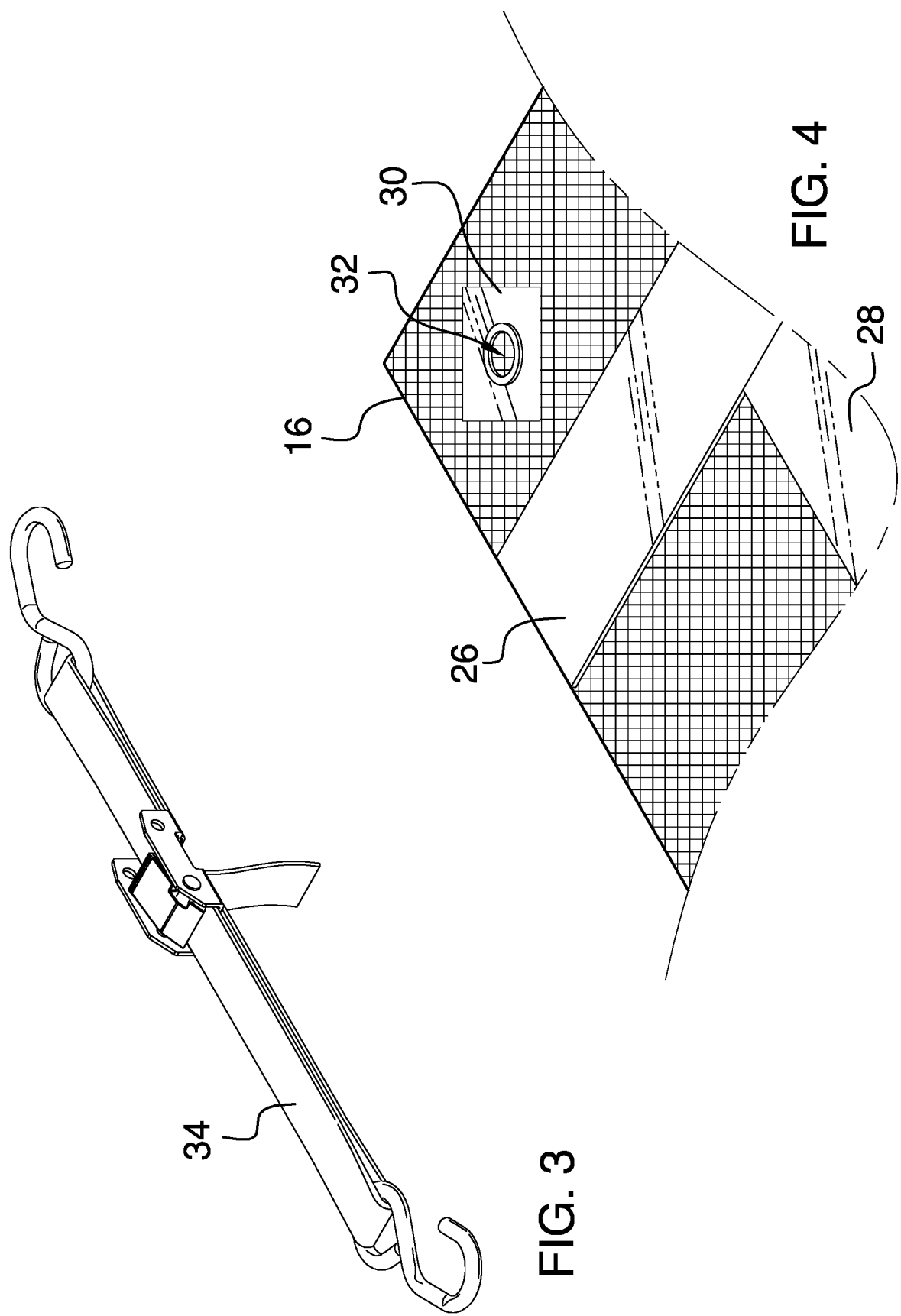

ROADWAY HAZARD WARNING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to hazard warning devices and more particularly pertains to a new hazard warning device for enhancing visibility of a disabled vehicle on a roadway.

BRIEF SUMMARY OF THE INVENTION

An embodiment of the disclosure meets the needs presented above by generally comprising a vehicle that has been disabled on the side of a roadway. A warning flag is positionable on the vehicle when the vehicle becomes disabled on the roadway. The warning flag has light reflecting properties for reflecting light from headlights of oncoming traffic. In this way the warning flag can alert the oncoming traffic to the disabled vehicle. A plurality of fastening straps is provided and each of the fastening straps is removably coupled between the warning flag and the vehicle for retaining the warning flag on the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a perspective view of a fastening member of an embodiment of the disclosure.

FIG. 4 is a perspective view of a warning flag of an embodiment of the disclosure.

DETAILED DESCRIPTION OF THE INVENTION

Figure 1:
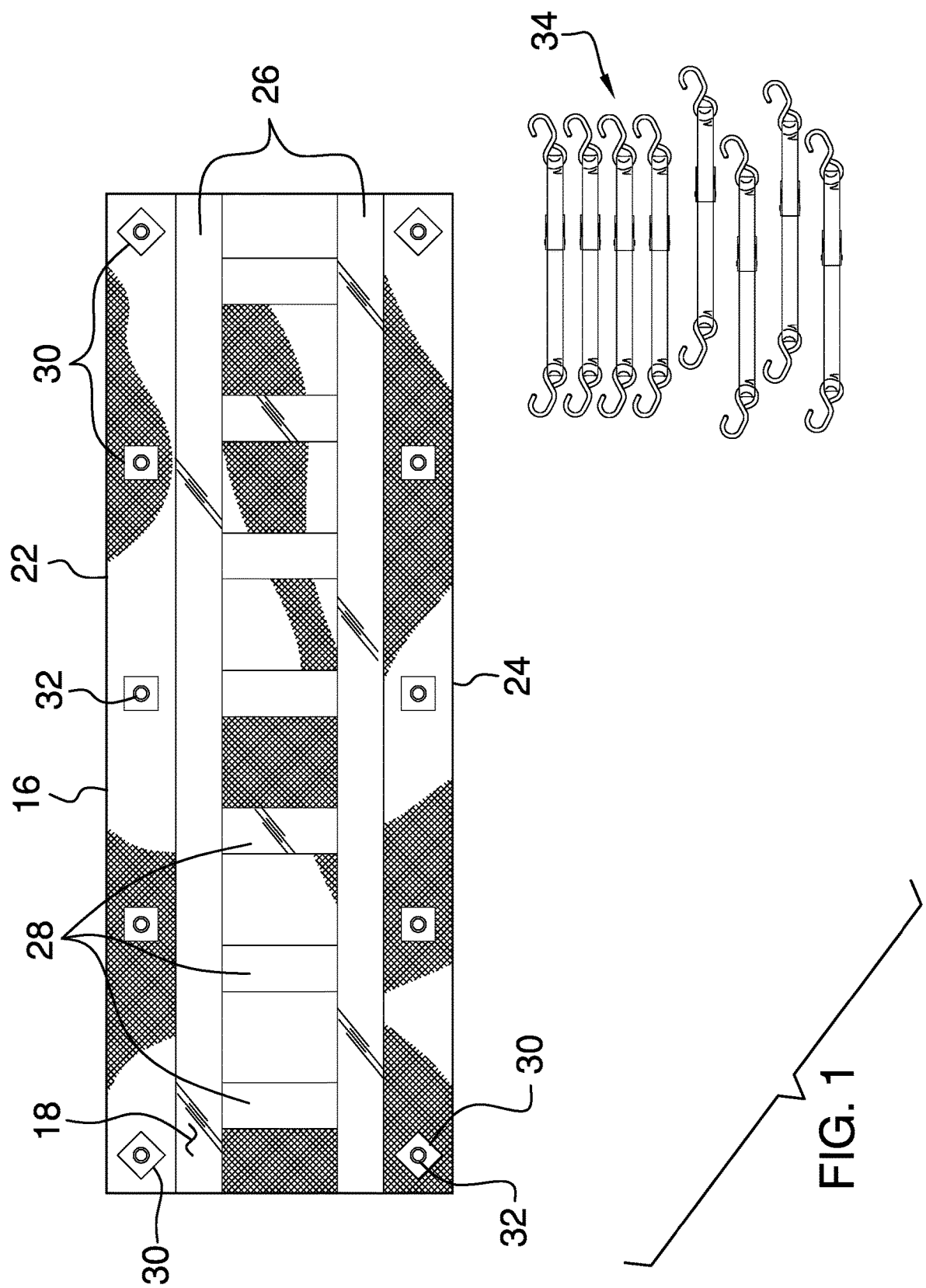
FIG. 1 is a perspective view of a roadway hazard warning assembly according to an embodiment of the disclosure.
Figure 2:
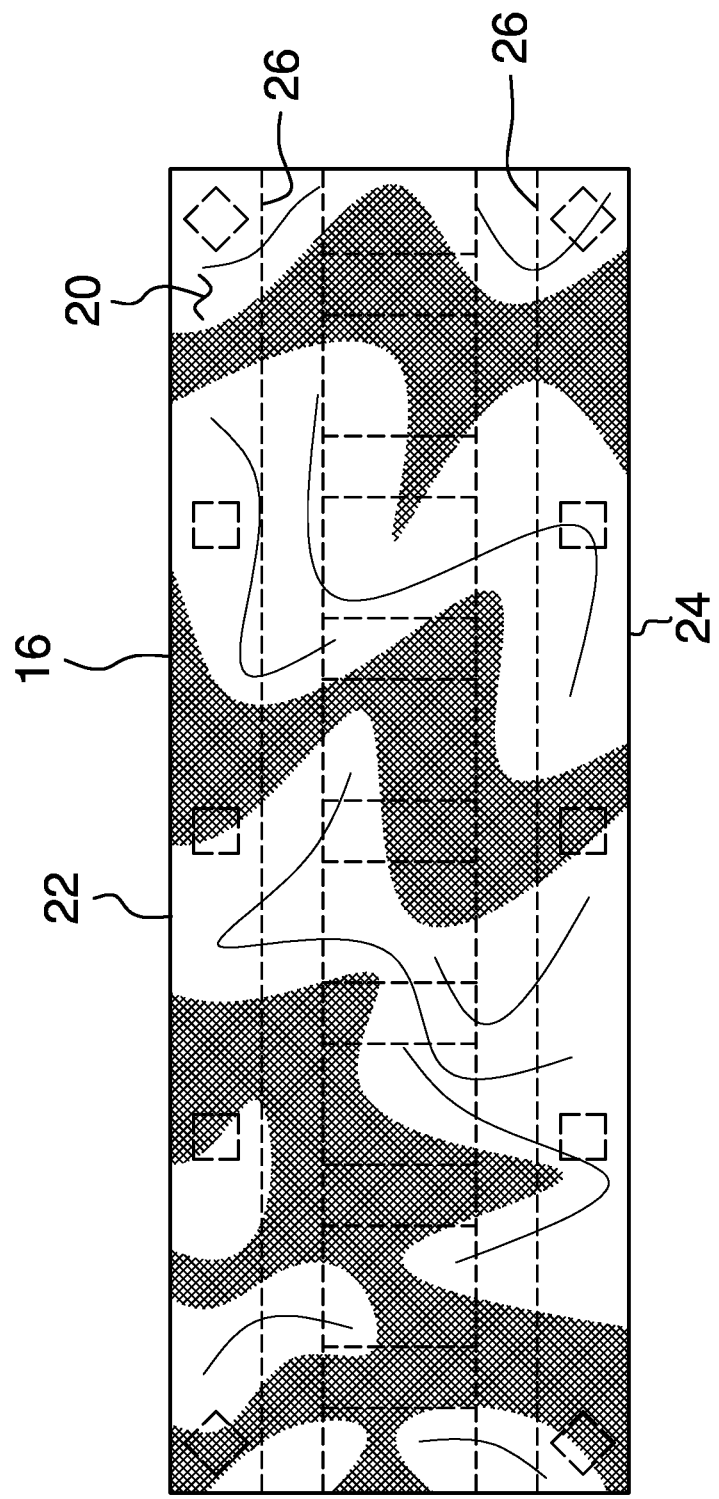
FIG. 2 is a back view of warning flag of an embodiment of the disclosure.
Figure 5:
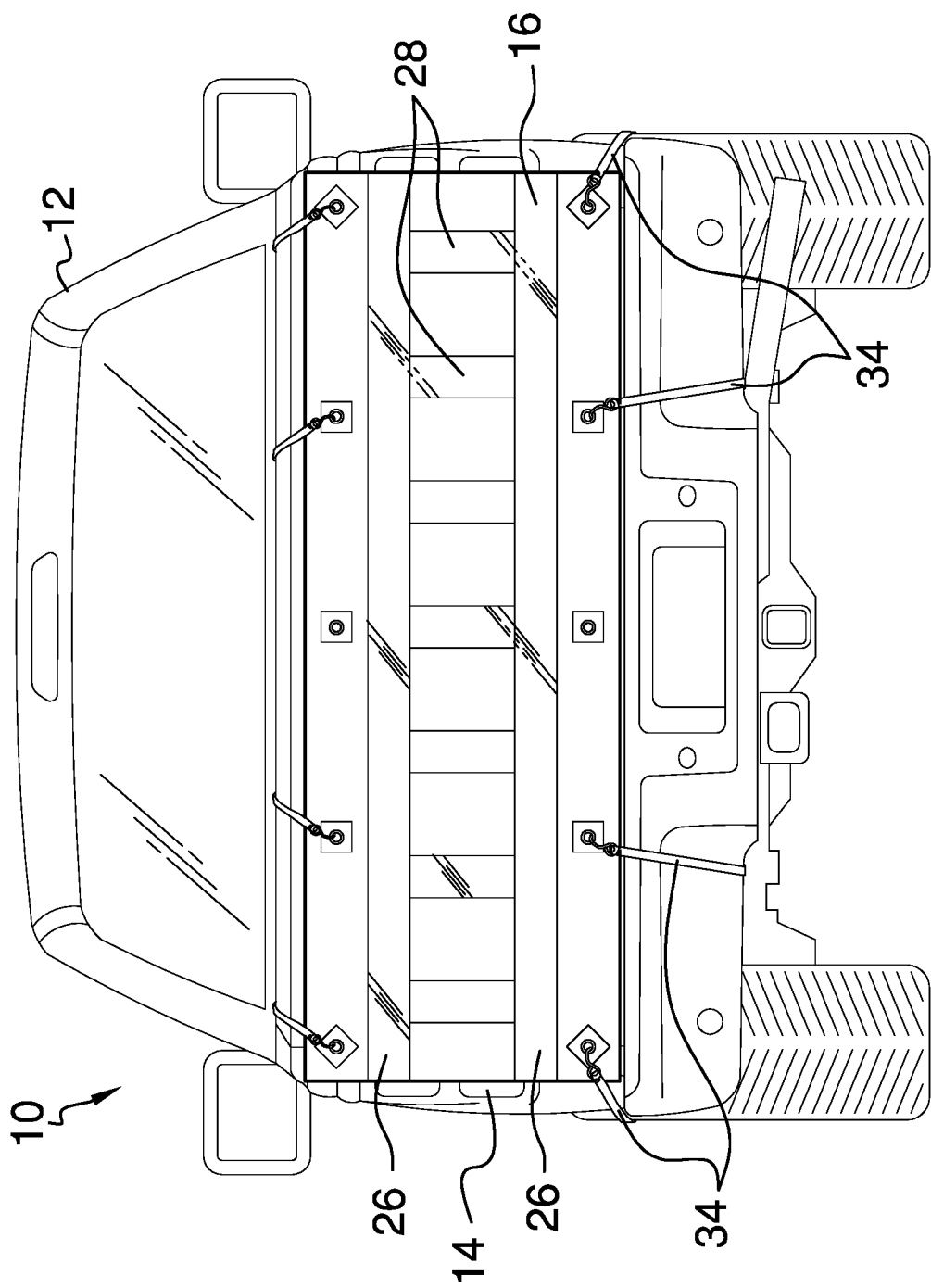
FIG. 5 is a perspective in-use view of an embodiment of the disclosure.

With reference now to the drawings, and in particular to FIGS. 1 through 5 thereof, a new hazard warning device embodying the principles and concepts of an embodiment of the disclosure and generally designated by the reference numeral 10 will be described.

As best illustrated in FIGS. 1 through 5, the roadway hazard warning assembly 10 generally comprises a vehicle 12 that has been disabled on the side of a roadway. The vehicle 12 has a rear side 14 and the vehicle 12 may be passenger vehicle, a cargo vehicle and any other type of motorized vehicle 12 that is driven on public roadways. A warning flag 16 is provided and the warning flag 16 is positionable on the vehicle 12 when the vehicle 12 becomes disabled on the roadway. Moreover, the warning flag 16 has light reflecting properties for reflecting light from headlights of oncoming traffic at night. In this way the warning flag 16 can alert the oncoming traffic to the disabled vehicle 12 thereby enhancing safety for the oncoming traffic at night. Additionally, the warning flag 16 may be brightly colored thereby enhancing visibility of the warning flag 16 during the day time.

The warning flag 16 has a first surface 18, a second surface 20, a top edge 22 and a bottom edge 24. The second surface 20 abuts the rear side 14 of the vehicle 12 having the first surface 18 being exposed when the warning flag 16 is positioned on the vehicle 12. The warning flag 16 has a width sufficient to extend substantially along the width of the rear side 14 of the vehicle 12. Additionally, the warning flag 16 may have a height of at least 27.0 inches for maximizing visibility of the warning flag 16 on the vehicle 12. Each of the first 18 and second 20 surfaces of the warning flag 16 may be comprised of a mesh material.

A plurality of reflective strips 26 is provided and each of the reflective strips 26 is coupled to the first surface 18 of the warning flag 16 and each of the reflective strips 26 is coextensively aligned with a respective one of the top 22 and bottom 24 edges. Additionally, each of the reflective strips 26 is comprised of a light reflecting material for reflecting the light from the headlights of oncoming traffic. Each of the reflective strips 26 may meet DOT C2 specifications for conspicuity marking.

A plurality of reflective patches 28 is each coupled to the first surface 18 of the warning flag 16. The reflective patches 28 are spaced apart from each other and are distributed laterally along the warning flag 16. Each of the plurality of reflective patches 28 is positioned between the reflective strips 26 and each of the reflective patches 28 is comprised of a light reflecting material for reflecting light from the headlight of oncoming traffic. Moreover, each of the reflective patches 28 may meet DOT C2 specifications for conspicuity marking.

A plurality of grommets 30 is coupled to the first surface of the warning flag 16 to define a plurality of openings 32 each extending through the first surface 18. The grommets 30 are spaced apart from each other and are distributed along each of the top 22 and bottom 24 edges. Each of the grommets 30 may comprise ring grommets or the like. A plurality of fastening straps 34 is provided and each of the fastening straps 34 is removably coupled between the warning flag 16 and the vehicle 12 for retaining the warning flag 16 on the vehicle 12. Each of the fastening straps 34 engages a respective one of the grommets 30, and each of the fastening straps 34 may comprise bungee cords, ratcheting cargo straps or other similar type of releasable fastening member that has an adjustable length.

In use, the warning flag 16 is positioned on the rear side 14 of the vehicle 12 when the vehicle 12 becomes disabled on the roadway due to mechanical failure or the like. Each of the fastening straps 34 is coupled between the warning flag 16 and the vehicle 12 thereby retaining the warning flag 16 on the vehicle 12 having the first surface 18 being exposed. Thus, each of the reflective strips 26 and the reflective blocks reflects light from the headlights of oncoming traffic thereby alerting the oncoming traffic to the disabled vehicle 12. In this way the safety of motorists on the roadway is enhanced during day time and night time driving conditions.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A roadway hazard warning assembly being configured to be positioned on a disabled vehicle thereby alerting drivers to the disabled vehicle, said assembly comprising:
   a warning flag configured for being positionable on the disabled vehicle said warning flag having light reflecting properties configured for reflecting light from headlights of oncoming traffic wherein said warning flag is configured to alert the oncoming traffic to the disabled vehicle, said warning flag has a first surface, a second surface, a top edge and a bottom edge, said second surface configured for abutting a rear side of the disabled vehicle when having said first surface being exposed when said warning flag is positioned on the disabled vehicle;
   a plurality of reflective strips, each of said reflective strips being coupled to said first surface of said warning flag, each of said reflective strips being coextensively aligned with a respective one of said top and bottom edges, each of said reflective strips being comprised of a light reflecting material configured for reflecting the light from the headlights of oncoming traffic;
   a plurality of reflective patches, each of said reflective patches being coupled to said first surface of said warning flag, said reflective patches being parallel and evenly spaced apart from each other and being distributed laterally along said warning flag, said plurality of reflective patches being positioned between and perpendicular to said reflective strips, each of said reflective patches being comprised of a light reflecting material configured for reflecting light from the headlight of oncoming traffic;
   a plurality of fastening straps, each of said fastening straps being removably coupled to said warning flag such that said plurality of fastening straps is configured for retaining said warning flag on the disabled vehicle.

2. The assembly according to claim 1, further comprising a plurality of grommets, each of said grommets being coupled to said first surface of said warning flag to define a plurality of openings each extending through said first surface.

3. A roadway hazard warning assembly being configured to be positioned on a disabled vehicle thereby alerting drivers to the disabled vehicle, said assembly comprising:
   a warning flag configured for being positionable on the disabled vehicle said warning flag having light reflecting properties configured for reflecting light from headlights of oncoming traffic wherein said warning flag is configured to alert the oncoming traffic to the disabled vehicle, said warning flag having a first surface, a second surface, a top edge and a bottom edge, said second surface being configured for abutting a rear side of the disabled vehicle when having said first surface being exposed when said warning flag is positioned on the disabled vehicle;
   a plurality of reflective strips, each of said reflective strips being coupled to said first surface of said warning flag, each of said reflective strips being coextensively aligned with a respective one of said top and bottom edges, each of said reflective strips being comprised of a light reflecting material configured for reflecting the light from the headlights of oncoming traffic;
   a plurality of reflective patches, each of said reflective patches being coupled to, said first surface of said warning flag, said reflective patches being parallel and evenly spaced apart from each other and being distributed laterally along said warning flag, said plurality of reflective patches being positioned between and perpendicular to said reflective strips, each of said reflective patches being comprised of a light reflecting material configured for reflecting light from the headlight of oncoming traffic;
   a plurality of grommets, each of said grommets being coupled to said first surface of said warning flag to define a plurality of openings each extending through said first surface, said grommets being spaced apart from each other and being distributed along each of said top and bottom edges; and a plurality of fastening straps, each of said fastening straps being removably coupled between said warning flag and said vehicle for retaining said warning flag on said vehicle, each of said fastening straps engaging a respective one of said grommets.

\* \* \* \* \*